(12) United States Patent
Maity et al.

(10) Patent No.: US 7,730,355 B2
(45) Date of Patent: *Jun. 1, 2010

(54) SYSTEMS AND METHODS FOR OUT-OF-BAND BOOTING OF A COMPUTER

(75) Inventors: Sanjoy Maity, Snellville, GA (US); Samvinesh Christopher, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 17 days.

This patent is subject to a terminal disclaimer.

(21) Appl. No.: 11/958,378

(22) Filed: Dec. 17, 2007

(65) Prior Publication Data

US 2008/0209262 A1 Aug. 28, 2008

Related U.S. Application Data

(63) Continuation of application No. 11/234,412, filed on Sep. 23, 2005, now Pat. No. 7,310,744, which is a continuation of application No. 10/138,736, filed on May 3, 2002, now Pat. No. 6,973,587.

(51) Int. Cl.
G06F 11/00 (2006.01)
(52) U.S. Cl. .............................................. 714/36; 713/2
(58) Field of Classification Search ...................... 714/4, 714/27, 36; 713/2
See application file for complete search history.

(56) References Cited

U.S. PATENT DOCUMENTS

| 5,706,239 | A | 1/1998 | Brys |
| 5,842,011 | A | 11/1998 | Basu |
| 6,026,458 | A | 2/2000 | Rasums |
| 6,421,777 | B1 | 7/2002 | Pierre-Louis et al. |
| 6,826,710 | B2 | 11/2004 | Merkin et al. |
| 6,973,587 | B1 | 12/2005 | Maity et al. |
| 7,310,744 | B2 | 12/2007 | Maity et al. |
| 2002/0147941 | A1 | 10/2002 | Gentile |

OTHER PUBLICATIONS

American Megatrends, Inc., *MegaRAC*. Nov. 9, 2001, printed from www.ami.com on Aug. 1, 2002, 2 pages.
American Megatrends, Inc., *AMI Remote Management Solutions*. Nov. 12, 2001. printed from www.ami.com on Aug. 1, 2002, 4 pages.
Bell et al., *Dell Remote Access: Overview and Usage: Dell OpenManage Systems Management*.. Apr. 2002. printed from www.dell.com on Aug. 1, 2002, pp. 1-15.

(Continued)

*Primary Examiner*—Marc Duncan
(74) *Attorney, Agent, or Firm*—Hope Baldauff Hartman

(57) ABSTRACT

The present invention is directed to systems and methods for remotely booting a server computer system. A boot request is received from the server computer. An access request is transmitted to a boot management system via a secondary communication channel in response to the received boot request. An access response is received from the boot management system. The access response includes boot data from a boot image accessible via the boot management system and compatible with the server computer. In response to the received access response, the boot data is extracted from the access response and forwarded to the server computer for processing and booting. Multiple responses may be required in certain instances to accumulate the entirety of the boot image.

20 Claims, 6 Drawing Sheets

OTHER PUBLICATIONS

Bell, *Dell OpenManage™ Server Administrator*, Jan. 2002, printed from www.dell.com on Aug. 1, 2002, pp. 1-7.
Bell et al., *Remote Systems Management Using the Dell: Remote Access Card*. May 2002. printed from www.dell.com on Aug. 1, 2002, pp. 81-84.
Brelsford et al., *DRAC III Field Repair Utility: Dell OpenManage*. Apr. 2002, printed from www.dell.com on Aug. 1, 2002, pp. 1-13.
Compaq, *Compaq Remote Insight Lights-Out Edition II*, QuickSpecs. Jun. 25, 2002, printed from www.compaq.com on Aug. 1, 2002, pp. 1-4.
Compaq, *Remote Insight Lights-Out Edition II: Inside the Card*. printed from www.compaq.com on Aug. 1, 2002, 3 pages.
Compaq, *Remote Insight Lights-Out Edition*. printed from www.compaq.com on Aug. 1, 2002, 2 pages.
Compaq, *Remote Insight Lights-Out Edition: Enabling Virtual Presence*. printed from www.compaq.com on Aug. 1, 2002, 2 pages.
Compaq, *Remote Insight Lights-Out Edition: Virtual Floppy Drive*. printed from www.compaq.com on Aug. 1, 2002, 2 pages.
Compaq, *Remote Insight Lights-Out Edition* vs. *Remote Insight Board/PCI*. printed from www.copmpaq.com on Aug. 1, 2002, 2 pages.
Compaq, *Remote Insight Board/PCI: in and out-of-band management*. printed from www.compaq.com on Aug. 1, 2002, 2 pages.
Compaq, *Integrated Remote Console for out-of-band management. printed from* www.compaq.com on Aug. 1, 2002, 1 page.
Dumitru, *DRAC III Remote Floppy Boot: Dell OpenManage Systems Management*. Apr. 2002. printed from www.dell.com on Aug. 1, 2002, pp. 1-15.
Ha Forum, *Providing Open Architecture High Availability Solutions*. Revision 1.0. Feb. 2001, pp. 1-112.
Nguyen, *Dell Remote Access Card (DRAC) III console Redirection: Dell OpenManage Systems Management*. Mar. 2002. printed from www.dell.com on Aug. 1, 2002, pp. 1-18.
Yousif, *Establishing a PPP Connection to DRAC III and Configuring the Connection for RAS: Dell OpenManage Systems Management*. Apr. 2002. printed from www.dell.com on Aug. 1, 2002, pp. 1-20.
U.S. Official Action dated Feb. 16, 2005 in U.S. Appl. No. 10/138,736.
U.S. Notice of Allowance/ Allowability dated Jul. 13, 2005 in U.S. Appl. No. 10/138,736.
U.S. Official Action dated Jun. 19, 2006 in U.S. Appl. No. 11/234,412.
U.S. Notice of Allowance / Allowability dated Oct. 2, 2007 in U.S. Appl. No. 11/234,412.

SYSTEMS AND METHODS FOR OUT-OF-BAND BOOTING OF A COMPUTER

CROSS REFERENCE TO RELATED APPLICATIONS

This application is a continuation of U.S. patent application Ser. No. 11/234,412, filed on Sep. 23, 2005, now U.S. Pat. No. 7,310,744, which is a continuation of U.S. patent application Ser. No. 10/138,736, filed on May 3, 2002, now U.S. Pat. No. 6,973,587, both of which are incorporated herein by reference in their entirety.

BACKGROUND OF THE INVENTION

The present invention is directed to systems and methods for out-of-band booting of a computer. More specifically, without limitation, the present invention relates to computer-based remote boot systems and methods for booting a server computer having a hot swap interface and a primary communication channel used to provide access to client computers, without requiring shutdown of the server computer or communication with the server computer via the primary communication channel, using a secondary communication channel connected to a boot management system.

A server normally boots from its usual source, which can be a local disk or boot device (for example, flash ROM etc.) attached to it or from a remote boot device through a primary communication channel such as the 'usual' network (LAN) connection. Failure of a server can cause problems ranging from minor inconvenience to catastrophic losses of time and money.

Theoretically, it would be desirable if a server did not fail at anytime. However, in a practical sense, server failures do occur. High availability sometimes is referred to by the time the server provides the service to its clients and measured by the number of nines ('9'). This number is a measurement of the approximation of the percentages of the amount of time the server provides the service per year. Following is the industry wide report about the 'nine factors' (see, e.g., "Providing Open Architecture High Availability Solutions," February, 2001, p. 13, http://www.haforum.org).

| Number of '9's | Downtime per year | Typical application |
| --- | --- | --- |
| 3 nines (99.9%) | ~9 hours | Desktops |
| 4 nines (99.99%) | ~2 hour | Enterprise server |
| 5 nines (99.999%) | ~5 minutes | Carrier class server |
| 6 nines (99.9999%) | ~31 seconds | Carrier switch equipments |

The main purpose of alternate boot strategy technology is to increase the availability and serviceability of a server. The fault management of the server may consist of the followings components:
1. Detection—the fault is detected properly
2. Diagnosis—detect the root cause of the fault
3. Isolation—so the rest of the system is not affected from the fault
4. Recovery—system is restarted for further operation
5. Repair—the faulty component is removed Among the above mentioned components detection, diagnosis and isolation can be better performed through a remote boot from an OS of choice and with proper diagnostic capability. This is due to the fact that the server may be experiencing a fatal problem, which can only be detected by an offline diagnostics. An offline diagnostic is a mechanism when the system is not operating normally. As the normal operation is suspended, the usual boot process is not possible and an out-of-band or virtual boot mechanism according to the present invention is more appropriate and advantageous.

Sometimes recovery and repair of the faulty components involve a graceful shutdown of the resident OS and replacement of one or more OS components. In such cases, the OS may not be functional to upgrade itself from a remote location. A virtual boot or out-of-band boot protocol provides a solution to this situation that is not possible with prior art approaches.

If the server faces the problems due to faulty behavior of the usual boot process defined, then the alternate boot path is mandatory to achieve the desired number of nines and to reduce the downtime.

To prevent the common failure of the server, a backup policy for the boot procedure is used. Two common techniques with respect to the former include providing an alternative local boot path or a remote boot using a server's primary communication channel with its clients.

As depicted in FIG. 1, a typical server computer 100 uses a local hard drive 120 as the source for the boot image used to boot the server; a typical alternative boot path could include use of a locally connected drive 130 loaded with a removable media such as a magnetic or optical disk containing a boot image or use of a second hard (fixed magnetic media) drive or optical fixed media drive. The requirement that an administrator must physically be present at the server to load and/or change the removable media limits the usability of this approach. The use of a local fixed drive requires a local copy of the boot image and may require local supervision by an administrator via input devices such as keyboard 140 and mouse 150 and output devices such as monitor 160.

Another alternative approach to booting a server 100, as depicted in FIG. 2, involves use of a boot image stored on a remote data storage 210 connected to the server's primary communication channel (e.g., Ethernet 230) with its clients 220, or to a secondary communication channel (e.g., secondary network 240). However, this mechanism fails to allow upgrade of any faulty component from multiple mass-storage images. For example, to rectify some problems, the OS must be upgraded, and this requires a series of images stored in multiple removable magnetic and/or optical disks, as the boot image is a static image and server cannot refer to other images. Also in some cases, to diagnose a typical problem, a series of tests may be executed from different mass-storage devices. A standard protocol to boot from a remote image does not allow this to occur.

In this method, a boot image is prepared and made accessible to the server 100 (through either in-band 230 or out-of-band 240) at anytime from a centralized location 210. Several prior art protocols already support this such as PXE (Preboot Execution Environment). However, this mechanism fails to upgrade any faulty component from multiple mass-storage images. For example, to rectify some problems, OS must be upgraded and this requires a series of images stored in multiple CDROM or floppies. As the boot image is a static image and server cannot refer to other images because the standard prior art protocols do not define this. Also in some cases, to diagnose a typical problem, a series of tests may be executed from different mass-storage devices. A protocol to boot from a remote image does not allow this to occur.

The out-of-band systems and methods according to the present invention avoid these limitations. A boot device is implemented at the server side. This device is presented as a ghost device or a virtual device to the server and the software components (such as BIOS and OS). Such devices will be presented as early in the power on process of the server. Hence the server can find this as a potential mass-storage device to boot from. The main advantage of such mechanism is once the boot process starts, it can follow with unlimited references of other mass-storage devices and images. As a result, the server can be repaired (or upgraded) easily.

SUMMARY OF THE INVENTION

The present invention is directed to systems and methods for remote booting of a server. One preferred embodiment of a remote boot system according to the present invention includes a system processor, a first communication interface adapted to connect the remote boot system to a hot swap interface of a server computer, and a second communication interface adapted to connect the remote boot system to a secondary communication channel allowing communication with a boot management system. The server computer will have one or more primary communication channels that it may use for communicating with various clients. The system processor is in communication with the first and second interfaces via any suitable communication channel or channels, in one preferred embodiment the system processor communicates with the interfaces via a system bus local to the remote boot system. The system processor may include one or more processing elements that provide boot request processing, input output reception/conversion/transmission and/or other functionality.

Accordingly, one preferred method of remotely booting a server according to the present invention includes a variety of steps that may, in certain embodiments, be executed by the environment summarized above and more fully described below or be stored as computer executable instructions in and/or on any suitable combination of computer-readable media. A boot request is received from the server computer. This boot request may result from the server computer's detection of an error or failure of its hardware and/or software; such detection may occur during, or subsequent to, the server computer booting. An access request is transmitted to a boot management system via a secondary communication channel in response to the received boot request. An access response is received from the boot management system. The access response includes boot data from a boot image accessible via the boot management system. This boot image is compatible with the server computer; however, this boot image may or may not be the same as the boot image via which the server computer typically boots. Further, the boot image accessible via the boot management system may not reside in and/or on a single data store or computer readable media but rather may require access to multiple data stores and/or computer readable media that may or may not be of the same type (e.g., storage of part of the boot image on a hard disk and/or ROM memory local to the boot management system and/or storage of part of the boot image on removable magnetic and/or optical media that may be placed in an appropriate drive connected to the boot management system). In response to the received access response, the boot data is extracted from the access response and forwarded to the server computer for processing and booting.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE PREFERRED EMBODIMENTS

Figure 1:
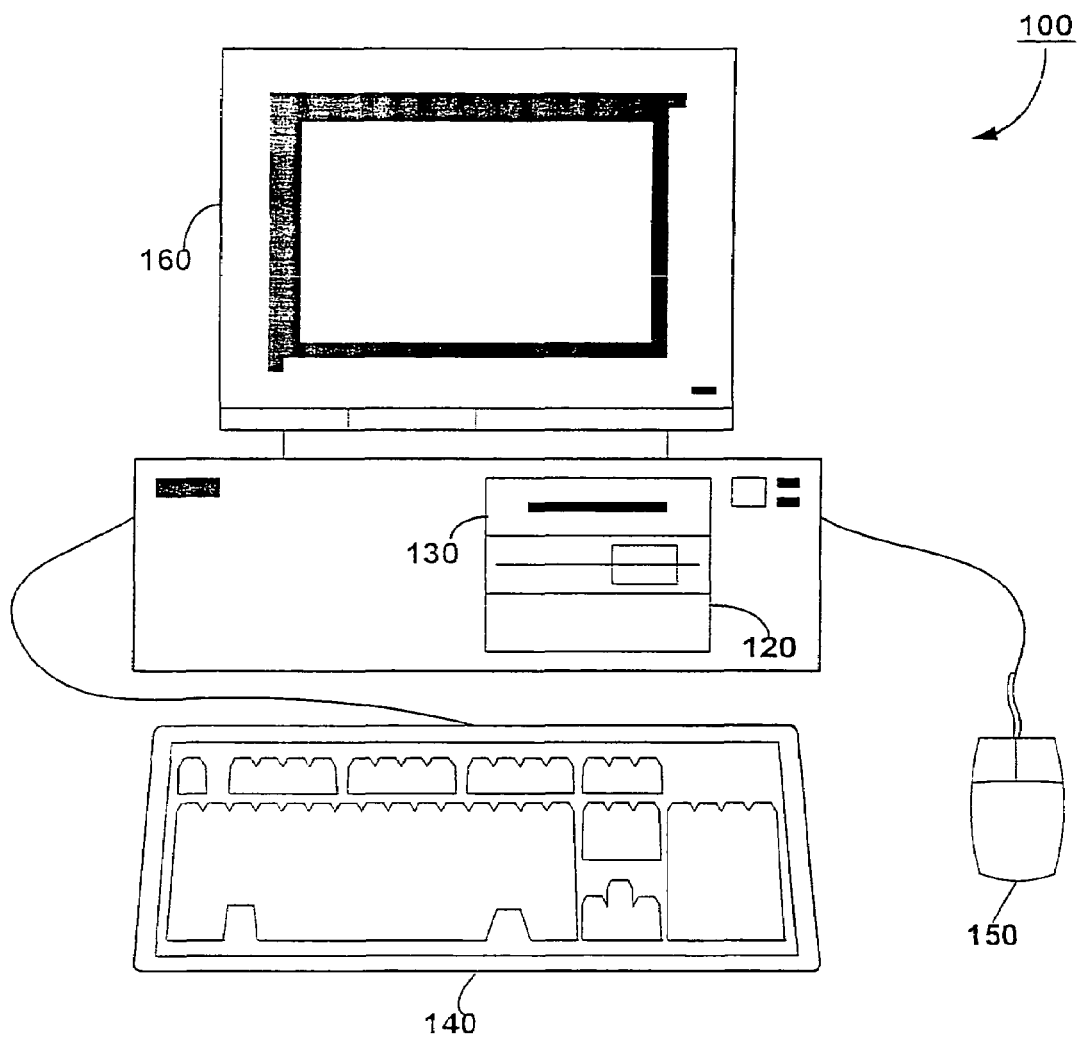
FIG. 1 depicts a typical prior art local boot environment.
Figure 2:
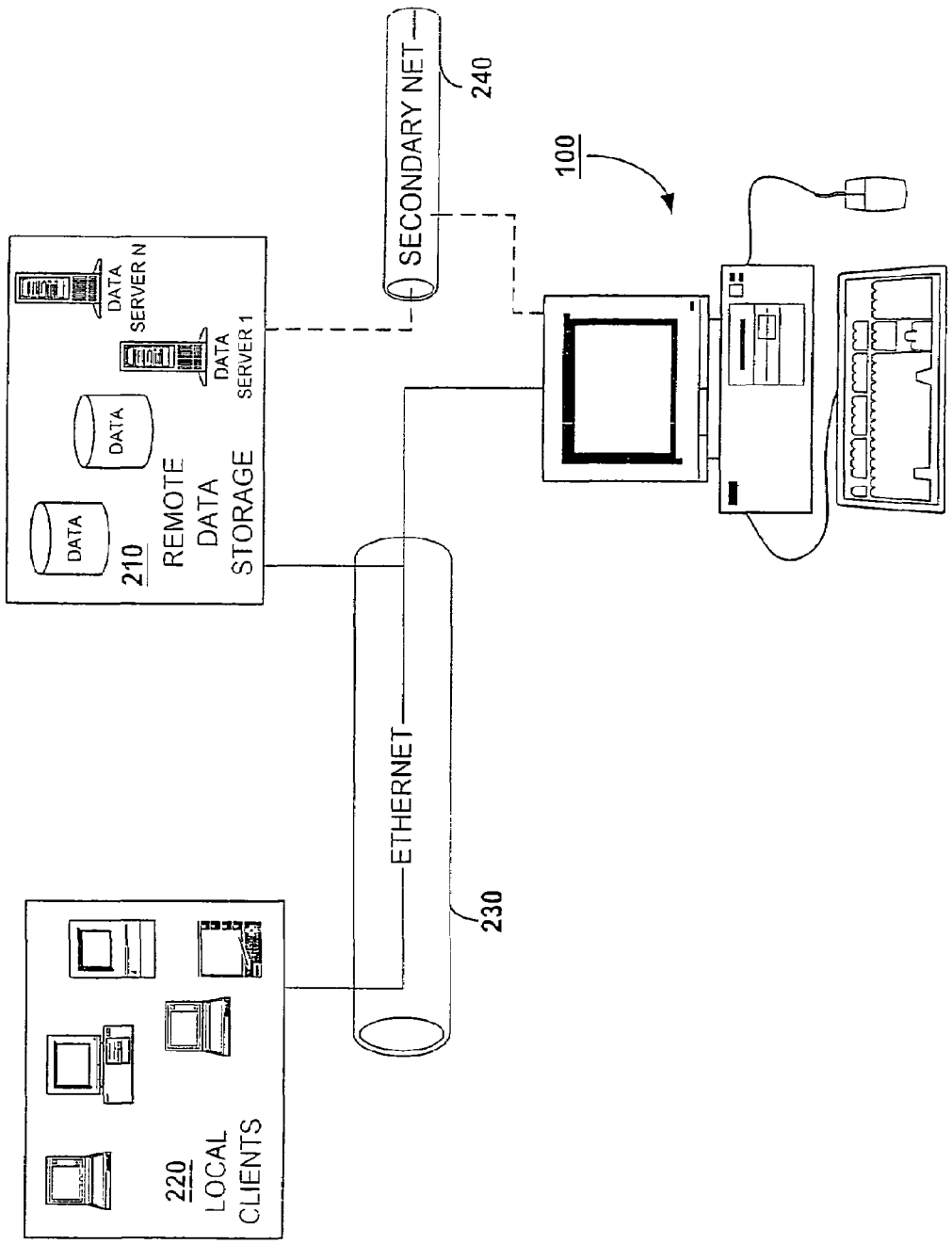
FIG. 2 depicts an alternative prior art approach using a remote boot image.

Exemplary embodiments of the present invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and, independently of the other endpoint.

As used herein, and in the claims that follow, the following terms and/or acronyms will have the meanings indicated below unless the context clearly dictates otherwise.

ATA Advanced Technology Attachments
ATAPI ATA Packet Interface
EIDE Enhanced Integrated Drive Electronics
FireWire I.E.E.E. 1394 Standard Bus Protocol
HIC Human Interface Component
Hot Swap Interface (HSI) An interface that supports the ability to add and remove devices to a computer while the computer is running and have the operating system automatically recognize the change. Examples of interface include protocols and/or standards supporting hot swapping include FireWire, PCMCIA and USB.
IDE Integrated Drive Electronics
LAN Local Area Network OBP Out-of-band Boot Protocol, one preferred embodiment of which is described in greater detail below.
OS Operating System
RAC Remote Access Controller
REMIO Remote I/O Protocol, one preferred embodiment of which is described in greater detail below.
RMC Remote Management Controller
SCSI Small Computer System Interface
USB Universal Serial Bus Architecture This section describes the main architecture of one or more preferred embodiments of the out-of-band boot procedure of a server of the present invention through dedicated hardware and/or software components. Such component also provides the ultimate manageability of the server through remote access. This is achieved through use of a 'virtual' boot device at the server side. When the server experiences any difficulty or the usual way is not functional any more, the systems and methods according to the present invention allow the server to continue booting from a remote boot device through another path—known as 'out-of-band' way. In one preferred embodiment, dedicated hardware and/or software components are present in the server to handle this scenario. This hardware/software combination sometimes referred as RAC (Remote Access Controller) or RMC (Remote Management Controller). This dedicated hardware provides separate network/modem connectivity and helps the server boot from the pre-specified boot device. Such network/modem connectivity is not directly accessible to the server; instead it is directly accessible through the dedicated hardware. This dedicated hardware differentiates the in-band and out-of-band connectivity to the server. In summary, the method by which a server continues to boot even when the usual boot mechanism is not available is referred herein as 'out-of-band boot' or 'virtual boot.'

Figure 3:
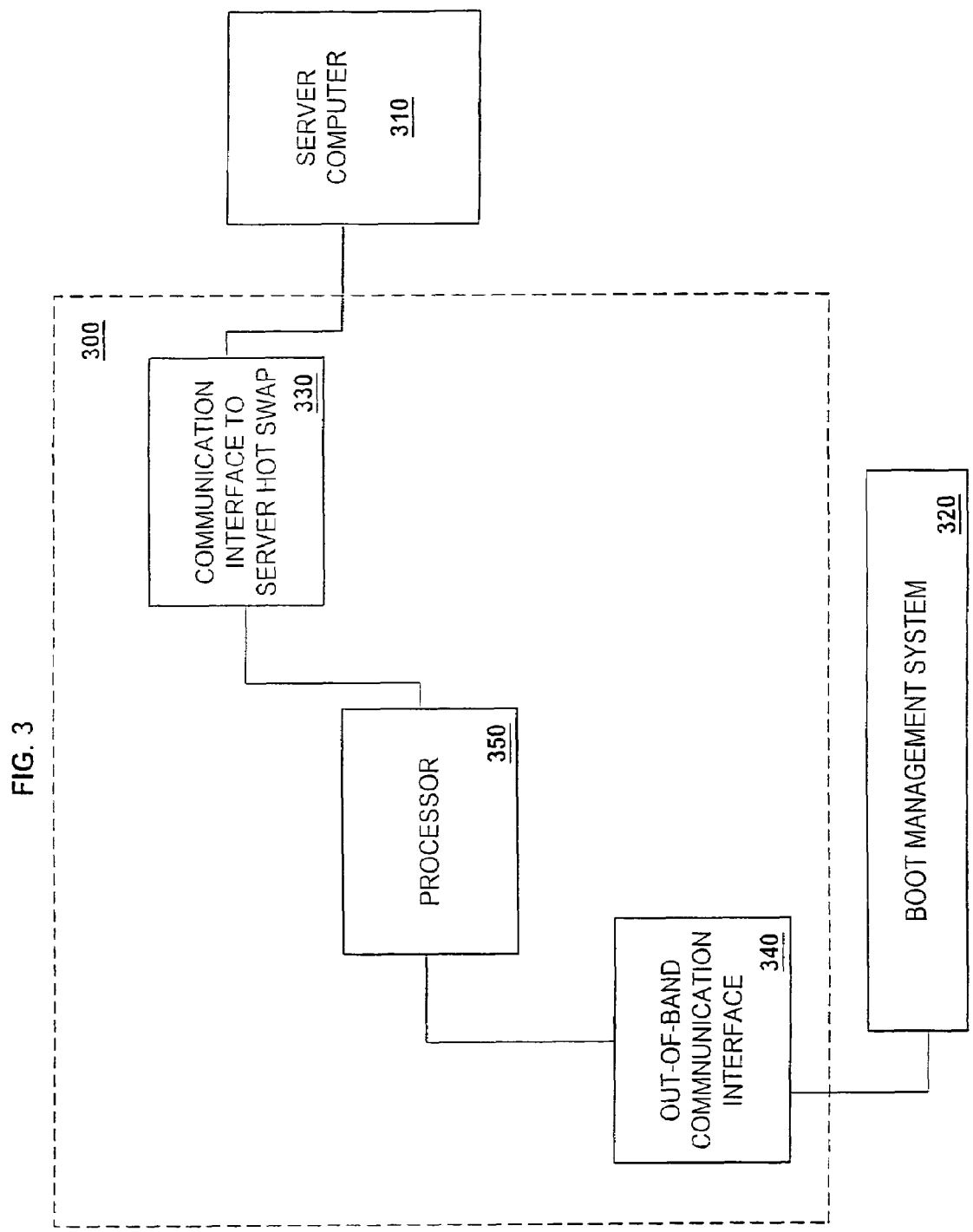
FIG. 3 is a logical block diagram of the components in a typical embodiment of the present invention.

FIG. 3 is a logical block diagram of a remote boot device 300 according to the present invention. The remote boot device 300 includes a first communication interface 330 adapted to connect the device to the HSI of the server computer 310. The remote boot device 300 further includes a second communication interface 340 adapted to connect the device to the boot management system 320 via a secondary communication path (a path other than the standard path by which the server computer 310 communicates with its clients). The device further includes a system processor 350 for executing the actions required to perform a remote boot procedure as discussed further below; in one preferred embodiment, the system processor may be one or more COLDFIRE family processors (Motorola, Inc., Schaumburg, Ill.), preferably M5272 processors.

The device 300 may be a stand-alone device external to the server. In such embodiments, the device 300 may have an integrated power supply (not shown) adapted for connection to a standard electrical power outlet. Other embodiments may 10 instead, or in addition, draw power from the server computer 310 via the first communication interface 330. The device 300 may also include a battery backup power supply (not shown), which may in certain embodiments be rechargeable from a primary power source (e.g., server computer 310, power outlet).

In other embodiments, the device 300 may be internal to the server computer 310. In such embodiments, the device may be integrated on the motherboard of the server computer 310. In such instances, the first communication interface 330 may be internally and/or directly connected to the hot swap interface of the server computer 310. An external port on the server case may be provided to connect any wiring that may be associated with the secondary communication path. Instead of integration with the motherboard, the device 300 may be provided as an expansion card to the server computer. In such embodiment, the device 300 may further include a local bus interface (not shown) allowing connection to the local system bus of the server computer 310. The local bus interface could be of any type suitable to the server computer 310 such as with one or more of ISA, EISA, PCI, PCI-X or PCMCIA. The device 300 may use the local bus connection to supplement and/or improve efficiency of accessing the server computer, its memory and associated peripherals. Depending upon efficiencies and bus availability/functionality, the device 300 may selectively and/or dynamically access the server computer 310 via the first communication interface 330 and/or the local bus connection. The local bus connection could be used 30 for such functionality as initiating boot, performing direct memory access to the server computer's primary storage and/or connecting with the server computer's peripheral devices for access and/or diagnostic purposes.

In either the integrated or addition case, power to the device may be provided by the power supply of the server computer 310 directly, via the first communication interface 330, or via a local bus connection where present. In internal embodiments, the device 300 may also include a battery backup power supply (not shown), which may in certain embodiments be rechargeable from a primary power source.

In some embodiments, the processor 350 may include one or more general-purpose processors such as an Intel 80386, 80486 or PENTIUM family of processor (Intel Corp., Santa Clara, Calif.). Alternatively, the processor 350 may be a special purpose processor such composed of one or more FPGA or ASIC elements with or without hard coded logic that performs the boot processes according to the present invention. Further, the processor 350 may include a combination of processing elements including general-purpose and/or special purpose processors. The term processing element may refer to (1) a process running on a particular piece, or across particular pieces, of hardware, (2) a particular piece of hardware, or either (1) or (2) as the context allows. In some embodiments, the boot processes and the peripheral remote control facilities may be spread across multiple processing elements.

In some embodiments, the device 300 may further include a system data store (SDS) (not shown). The SDS could include a variety of primary and secondary storage elements. In one preferred embodiment, the SDS would include RAM as part of the primary storage; the amount of RAM might range from about 128 MB to about 4 GB although these amounts could vary and represent overlapping use such as where the device provides other functionality such as pure communication via the secondary communication path, remote management functionality other than for boot purpose or remote control/access of peripheral devices locally connected to the boot management system. In addition to, or instead of, RAM memory, some embodiments may include writeable non-volatile memory such as FLASH memory; in one preferred embodiment, the amount of flash RAM might range from about 64 KB to about t 6 MB. The primary storage may in some embodiments include other forms of memory such as cache memory, registers, non-volatile memory (e.g., ROM, EPROM, etc.), etc.

The SDS may also include secondary storage including single, multiple and/or varied servers and storage elements. For example, the SDS may use internal storage devices connected to the system processor 350. It will be understood by those skilled in the art that the different information used in the boot processes and systems according to the present invention may be logically or physically segregated within a single device serving as secondary storage for the SDS; multiple related data stores accessible through a unified management system, which together serve as part of the SDS; or multiple independent data stores individually accessible through disparate management systems, which may in some embodiments be collectively viewed as part of the SDS. The various storage elements that comprise the physical architecture of the SDS may be centrally located, or distributed across a variety of diverse locations. The storage elements may include one or more standard magnetic and/or optical disk drives using any appropriate local interface (e.g., IDE and SCSI) or network-based file system interface.

The architecture of the secondary storage of the system data store may vary significantly in different embodiments. In several embodiments, database(s) are used to store and manipulate the data; in some such embodiments, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), MySQL (MySQL AB, Sweden) or Adaptive Server Enterprise (Sybase Inc., Emeryville, Calif.), may be used in connection with a variety of storage devices/file servers that may include one or more standard magnetic and/or optical disk drives using any appropriate interface including, without limitation, IDE and SCSI. In some embodiments, a tape library such as Exabyte XS0 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof may be used. In other embodiments, the data store may use database systems with other architectures such as object-oriented, spatial, object-relational or hierarchical or may use other storage implementations such as hash tables or flat files or combinations of such architectures. Such alternative approaches may use data servers other than database management systems such as a hash table look-up server, procedure and/or process and/or a flat file retrieval server, procedure and/or process. Further, the SDS may use a combination of any of such approaches in organizing its secondary storage architecture.

The boot management system 320 as use with and/or as part of the present invention will minimally include its own boot management system data store, which may be of a form or format similar to the SDS as described above with respect to the remote boot device 300. During the boot processes such as described below, the boot management system will have access to a boot image compatible with the server computer 310 via its boot management system data store (a boot image input device). This boot image may reside in and/or on any combination of fixed and/or removable media accessible to the boot management system. The boot management system 320 further includes a management communication interface adapted to connect the boot management system 320 with the secondary communication channel.

The boot management system 320 will further include a boot management processor. As with the system processor 350 of the remote boot device 300, the boot management processor may include one or more general-purpose processors such as an Intel 80386, 80486 or PENTIUM family of processor (Intel Corp., Santa Clara, Calif.). Alternatively, this processor may be a special purpose processor such composed of one or more FPGA or ASIC elements with or without hard coded logic that performs the boot processes according to the present invention. Further, this processor may include a combination of processing elements including general-purpose and/or special purpose processors. The boot management system may include software components stored on its data store that support interaction with the remote boot device 300. Such software components may include elements that may and/or may not require human interaction with the boot management system as further described below.

The secondary communication interface 340 may in some embodiments be a generalized interface adapted to receive suitable communication hardware allowing communication with the boot management system 320 via the secondary communication path. For instance, the secondary communication interface 340 may be a standard bus interface connection such as ISA, EISA, PCI, PCI-X or PCMCIA, which may accept suitable communication hardware dependent upon the secondary communication path such hardware in certain embodiments could include a modem, a network interface adapter and/or other suitable hardware. In other embodiments, the second communication interface may include the requisite communication hardware supporting direct communication from the device 300 to the boot management system 320 via the secondary communication path.

Figure 4:
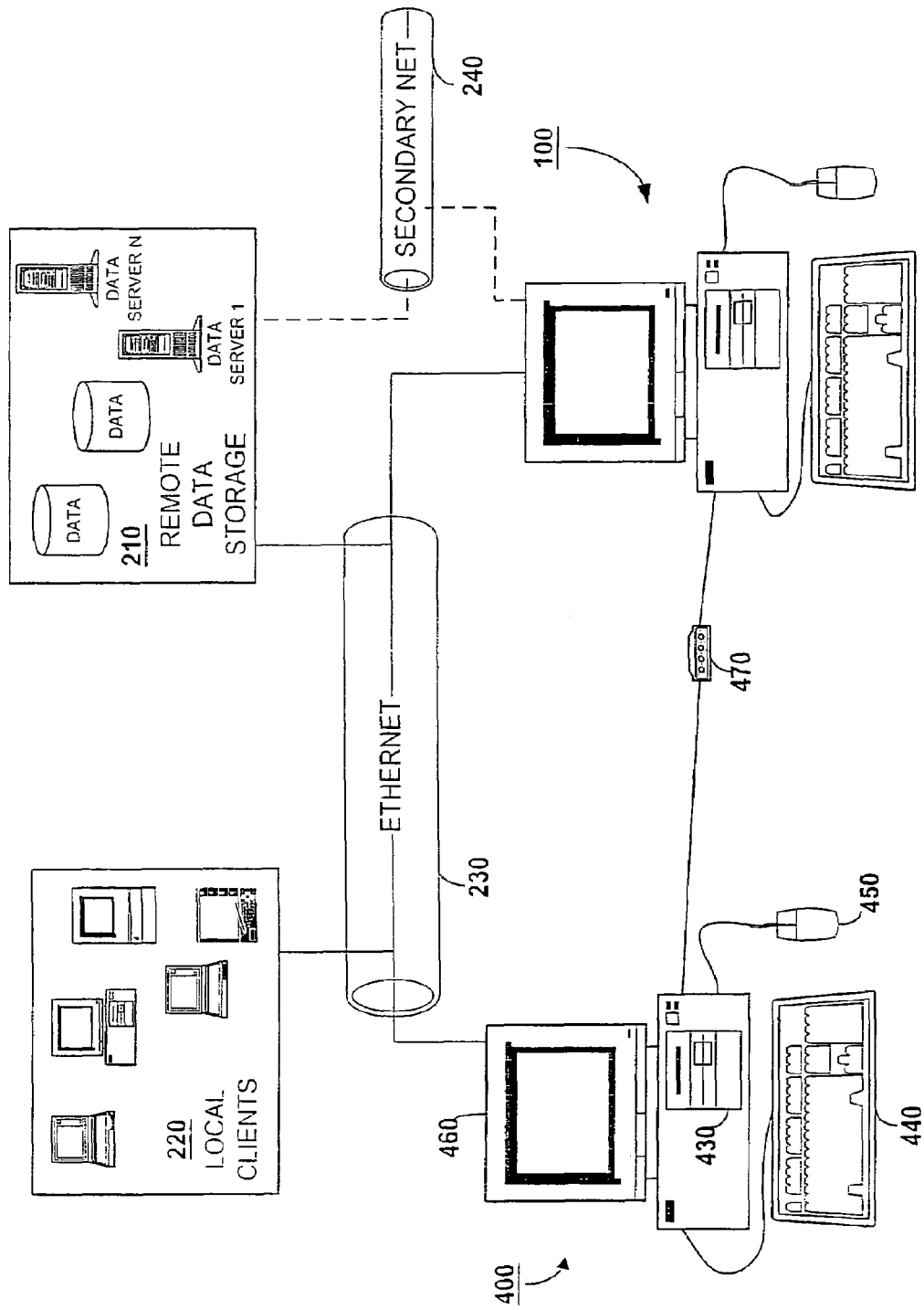
FIG. 4 depicts one exemplary embodiment of the present invention.

FIG. 4 depicts one preferred embodiment according to the present invention. Server 100 may have one or more local boot devices. Server 100 may also have access to one or more remote boot images stored in remote data storage 210 that is accessible either through a primary (e.g., Ethernet 230) or an alternative (e.g., modem 240) communication channel.

Remote boot device 470 connects to the hot swap interface of server 100 and connects to a secondary communication channel allowing communication with a boot management system 400. The remote boot device 470 may include the communications hardware allowing communication with the secondary communication channel, or such hardware may be separately purchased and connected to the secondary communication interface of the boot device. In some embodiments, the hardware of the remote boot device may be integrated into such communication hardware; for example, the hardware may be added to a modem or network interface card. For instance, remote boot device 470 could be an external modem connected to the hot swap interface of server 100 and a telephone line that serves as the secondary communication path. In some instances, such as shown in FIG. 4, the boot management system 400 may have a connection to the server's primary communication channel (e.g., Ethernet 230); however, such a connection is not required.

In some embodiments, the boot management system may support a variety of peripheral devices such as its data store (symbolically represented by hard drive 430), keyboard 440, mouse 450 and/or monitor 460. An administrator present at the boot management system 400 may use these peripherals to remotely control the boot, diagnostic and/or upgrade of the server 100. In some instances, the administrator may be required to use these peripheral devices in order to control the progress of the actions taking place at the server 100. The administrator may need to manually switch among removable media across which the boot image spans or switch between media containing differing diagnostics for execution on the server 100. The boot management system 400 may forward input actions from its peripherals over the secondary communication channel to the remote boot device 470 for ultimate delivery and execution by the server 100. In addition, the server 100 may forward output actions that would be rendered by its local peripherals to the remote boot device 470 for ultimate deliver and execution by the boot management system 400.

Remote Peripheral Access Architecture

As will be understood by those skilled in the art, the boot systems and methods 10 described herein provide an exemplary embodiment of a remote peripheral access system and method. Accordingly, any peripheral attached to, or a part of, the boot management system 400 may be accessible or addressed as a hot swap device by the server computer 100 via a remote peripheral access device as if the peripheral were a local hot swap peripheral attached to the server 100. The remote peripheral access device could include the same hardware as described with respect to the remote boot device 300 according to the present invention. In such an approach, the remote peripheral device would include the software components that perform mappings with respect to peripherals in addition to those described below with respect to the use of remote peripheral access with respect to the booting procedures. Those skilled in the art would appreciate that the mappings as described below with specific peripherals could be used as templates for implementing mappings with respect to any other peripheral device, or device type, for which remote access is desired.

Figure 6:
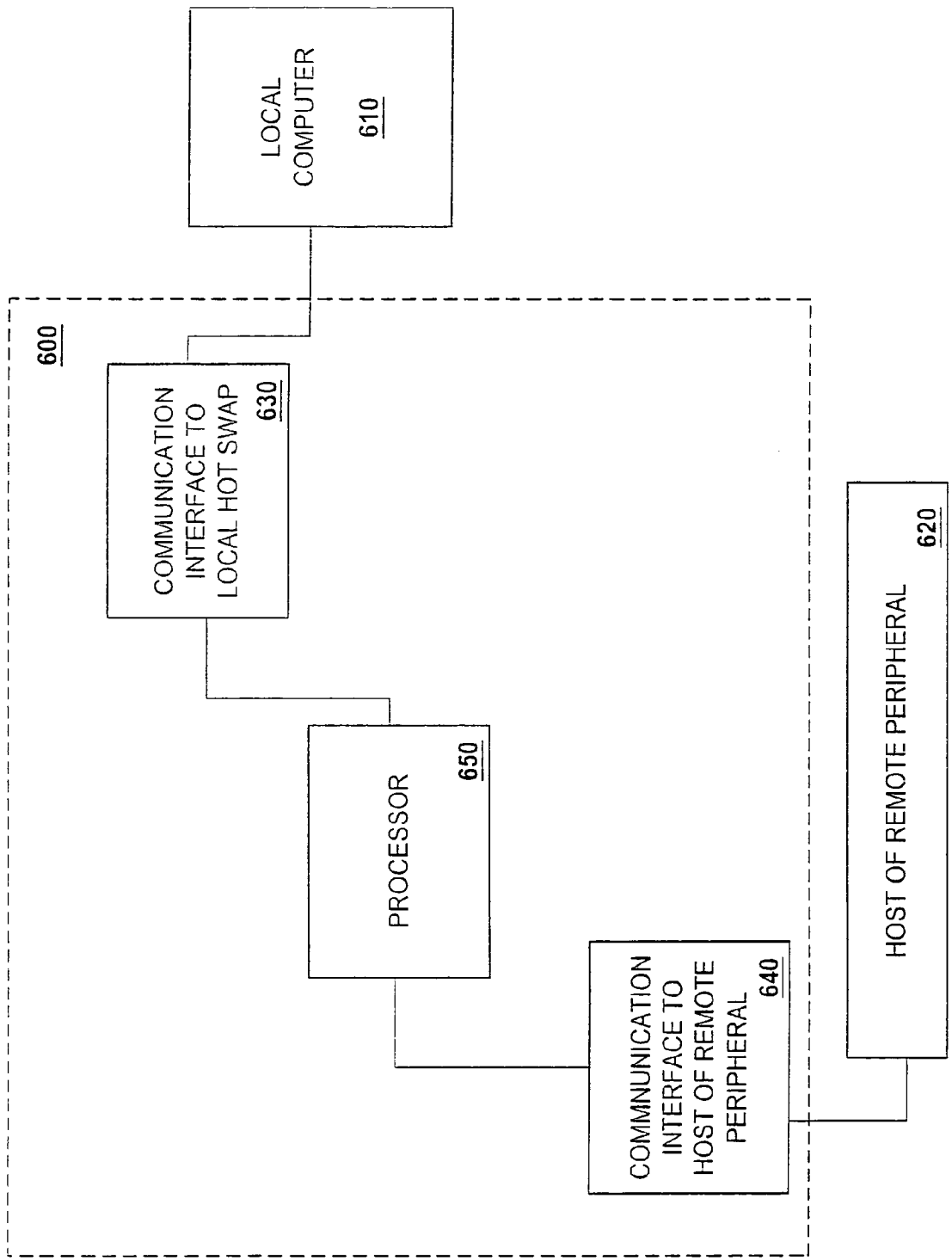
FIG. 6 is a logical block diagram of the components in a typical embodiment of a generalized remote peripheral access device according to the present invention.

FIG. 6 depicts a logical diagram of such a remote peripheral access device 600. The hardware components depicted may include a hot swap interface 630, peripheral 25 host communication interface 640 and processor 650. These hardware components may have the same parameters and variations as described above with respect to the analogous components of remote boot device 300. Similarly, the remote peripheral device 600 may have the same variations and additional elements as described with respect to the remote boot device 300 above. The peripheral host communication interface 640 need not, however, connect necessarily to a secondary communication path; this interface need only connect to any suitable communication channel to the peripheral host 620. The local computer 610 may use the remote peripheral access device 600 to access on a hot swap basis any supported peripheral directly or indirectly connected to the remote peripheral host 620. It will be understood that one indirect approach would include a peripheral accessible to remote peripheral host 620 via a further remote peripheral access device. The remote peripheral access device 600 would include software for facilitating communication between the local computer 610 and the remote peripheral host 620 as described below with respect to the remote boot device 300. The mappings available, however, need not be limited to those required to support a booting process.

Remote Input/Output Processes

Figure 5:
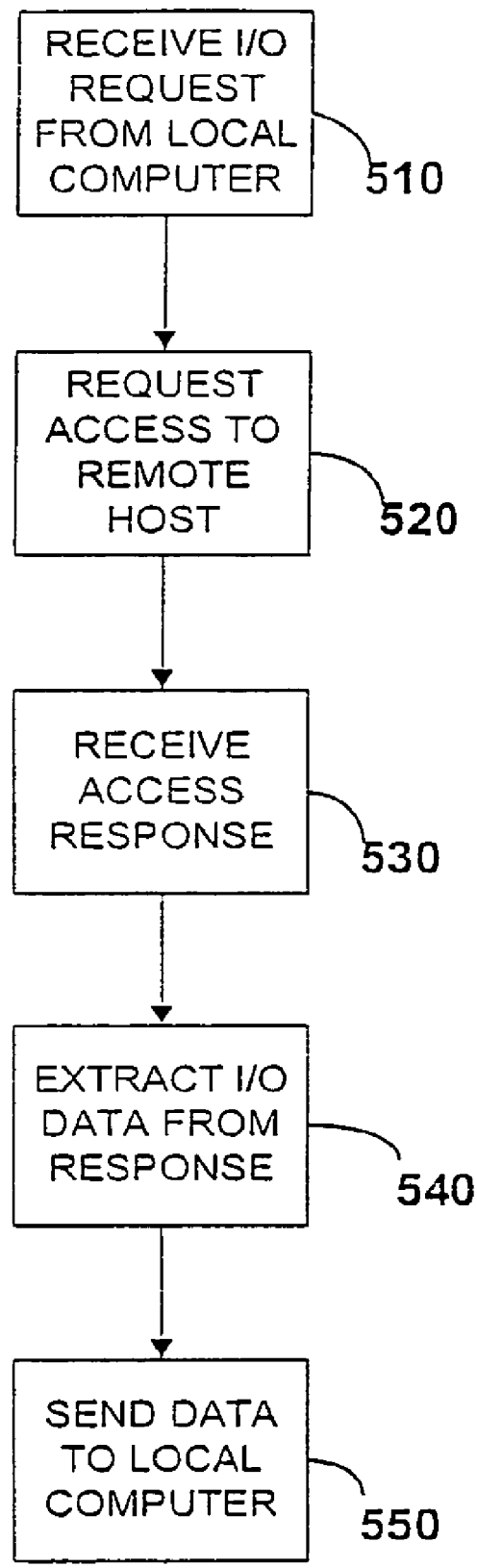
FIG. 5 is a flow chart depicting a remote input/output process according to one preferred approach of the present invention.

FIG. 5 depicts a process by which the device, which may in some embodiments be the remote boot device 300 or the remote peripheral access device 600 as described above, facilitates communication between a local computer connected via the host swap interface and a remote computer connected to its second communication interface. The device receives an input and/or output request from the local computer connected via the host swap interface in step 510. In one embodiment, this request may be a boot request that in some instances would be triggered by a boot failure with respect to one or more primary boot devices detected by the local computer.

The request from the local computer may include data that must be extracted from this request. In other embodiments, the request may include a reference to data pertinent to the request that the device may acquire from local computer either directly or indirectly. For instance, in certain embodiments where the device includes a connection to the system bus of the local computer, the device may directly retrieve data from the primary storage of the local computer.

The device sends an access request to the remote computer in step 520. This request requests access to a target peripheral accessible to the remote computer. In certain embodiments, the request may be a boot request requesting access to a boot image accessible via the system data store of the remote computer. If the request is for access to a target peripheral for the purposes of output such as a monitor, a printer or a write access to a storage device, the access request may further include data to be output to the target peripheral; this included data may be a portion of a larger data set that will be output to the target peripheral via multiple requests. In certain embodiments, the request may be encrypted or sent via an encrypted communication protocol. The device may break a single access request into multiple units for ease of transmission. For instance, the device could segment data captured from the local computer processor destined for its monitor into multiple access requests directed to a monitor accessible to the remote computer.

The device receives a response to the access request from the remote computer in step 530. The response may be a simple acknowledgment of correction to the target peripheral, or an acknowledgment of completion of an output to the target peripheral. If the access request included a request for data from a target peripheral at the remote computer such as a mouse, a keyboard or a read access of a storage device, the response may include data from the target peripheral; this included data may be a portion of a larger data set that will be transferred from the target peripheral via multiple requests and/or responses. For instance, boot image data, or a portion thereof, retrieved from the system data store accessible to the remote computer may be included in the response. In certain embodiments, the response may be encrypted or sent via an encrypted communication protocol. A single access request may in certain instance trigger multiple responses, or a single response broken into multiple units for ease of transmission.

In step 540, the device extracts any data included in the response. The device then sends any such data to the local computer in step 550. The device would reformat any data received into a format compatible with delivery via the hot swap interface and potentially with any device drivers resident on the local computer. The series of steps 520 to 540 may be repeated to completely service the request.

The remote computer includes software capable of communicating with the device. This software would receive an access request from the device and formulate an appropriate response to the request. The request would include the identification of a target peripheral accessible by the remote computer. The request may initiate an extended communication session between the device and the remote computer. In this instance, the response would include session specific data to the device that would allow the device and the remote computer to maintain the consistency of the session. Session specific data would then be used to exchange multiple requests and responses. These requests and responses may include data received from, or directed to, the target peripheral. In one exemplary embodiment, the data received from the target peripheral may be boot image data, or portions thereof.

In certain embodiments, the access request may include data in which case the software would extract the data from the request. The software would then service the access request. The servicing of the accessing request may simply include forwarding extracted data to the target peripheral and transmitting an acknowledgment response to the device. In instances where the request is seeking data from a target peripheral, the response may include the data from the target peripheral, such as boot image data. Multiple access requests may be required to send or receive the complete set of data to or from the target peripheral.

In some embodiments, the software may include an interactive element. In such embodiments, an administrator may, or must, facilitate the servicing of requests. For instance, an administrator may be required to manually switch removable media in a drive local to the remote computer in order to provide a complete boot image that spans multiple removable media. In another example, an administrator may use a keyboard, mouse and monitor at the remote computer to perform a controlled boot of the local computer or to selectively perform diagnostics on the local computer.

Exemplary procedures and mappings in accordance with the remote input/output processed detailed above and useful for providing the remote booting aspect of the present invention are provided below. Those skilled in the art will understand that these procedures and mappings are exemplary only and that other suitable procedures, encodings and mappings could be developed to support the remote booting within the context of the present invention.

Boot Procedure

In the boot procedure according to one exemplary method of the present invention, the server computer identifies a boot failure early in the boot procedure and is unable to identify and/or use either an alternative local boot image and/or a standard 30 prior art remote boot image. In this case, the server finds a virtual device from which to boot. This device may be implemented by the dedicated hardware in the server as described above.

In one preferred embodiment, the device connects to a remote intelligent Human Interface Component (HIC) executing on the boot management system that allows interactive control of the remote boot. In other embodiments, a 'dumb' boot image can be accessed and used for the boot procedure by the server as if the boot image accessed according to the present invention were a local or prior art remote boot image.

The dedicated out-of-band hardware (remote boot device) may further support a 10 more intelligent interactive boot process that may use a message based protocol and a boot session between the remote boot device and the remote HIC. Accordingly, several methods may be used to initiate the interaction with the remote HIC.

In one preferred approach, the server redirects all the boot service requests to the remote HIC while the server is booting. This may be done through the BBS (BIOS Boot Specification) compliant component present in the remote boot device. This method, however, can be used only at the time of power up of the server. Redirecting the services is not possible at runtime while the OS is up and running and functioning normally. So updating any software component or diagnosing the server typically requires a graceful shutdown of the server. This method is perfect for the cases when the server is facing severe faults and becomes non-functional and needs a shutdown in any case.

In another preferred method, the remote boot device (such as CDROM) is presented to the server as a hot swap device that includes a compatible boot image, the BIOS can use that as the medium of its boot procedure. Upon accessing the device, the remote boot devices opens a remote boot session with the HIC. Each device access or the I/O cycle is encapsulated by the remote boot device and used for the boot session with the HIC.

Boot Session

In the approaches introduced above, a boot session is generally established between the dedicated hardware of the remote boot device and the remote HIC. This session is created at the time of the first booting request from the server. The boot session in some embodiments may require a login process for security; in some such embodiments, the login process and communications associated therewith may be encrypted and/or use an encrypted communication channel. The session carries all the I/O commands as a special packet. For security, some embodiments may encrypt such commands and/or the communication pathway for these commands. These command packets may be referred to as Remote Boot Session or RBS packet. An exemplary implementation of RBS packets is described in greater detail below. Each RBS packet is parsed and analyzed by the remote HIC. Remote Boot Session or RBS packets perform the Remote I/O or REMIO functionality as described below.

REMIO Functionality

The REMIO functionality may, in one exemplary embodiment, use the definitions and packet structures defined as follows:

| REMIO Server | The remote machine on the network, which has the actual IO device and serves the client thru REMIO packets. |
| REMIO Client | The client machine on the network, which simulates the IO device by accessing the server's IO device thru REMIO packets. |

In the case of the remote boot system according to the present invention, the boot management system serves as the REMIO Server and the remote boot device serves as the REMIO Client. In one preferred embodiment, a REMIO packet may have the following structure.

REMIO Packet Structure:

| Offset | Field Name | Number of Bytes | Comment | Written By |
| --- | --- | --- | --- | --- |
| 0 | Signature | 8 | R, E, M, I, O, Blank, Blank, Blank | Fixed Value |
| 8 | REMIO Version | 2 | REMIO Version - Major byte & Minor byte | Server/client |
| 10 | Header Length | 1 | REMIO Header Length (Currently 32 bytes) | Server/client |
| 11 | Header Checksum | 1 | Modulo 100 Checksum of Header | Server/client |
| 12 | Data Length | 4 | Length of Data following Header | Server/client |

-continued

REMIO Packet Structure:

| Offset | Field Name | Number of Bytes | Comment | Written By |
|---|---|---|---|---|
| 16 | Device Type | 1 | See "Assigned Numbers for REMIO" | Client Only |
| 17 | Protocol | 1 | See "Assigned Numbers for REMIO" | Client Only |
| 18 | Sequence No. | 4 | Sequence Number | Client Only |
| 22 | Client Data | 2 | Client Specific Data (Not used by server) | Client Only |
| 24 | Dir_Status | 1 | See "Assigned Numbers for REMIO" | Server/Client |
| 25 | Server Capability | 1 | See "Assigned Numbers for REMIO" | Server Only |
| 26 | Reserved | 6 | Reserved for Future Use | — |

(Note:
All the fields in one preferred embodiment are little endian and binary format unless specified otherwise)

The protocol and device specific data follows the header. The format of this data is specific to the protocol and the devices. The following description outlines certain assignments of with respect to the above packet structure as used in one preferred embodiment of the present invention.

Assigned Numbers for REMIO
Protocol:
1.—Reserved
2.—SCSI/ATAPI
3.—Floppy
4.—IDE/ATA
    4—0xFF—Reserved
Device Type:
The High Bit specifies whether it is a removable device (1) or not (0) and the remaining 7 lower bits specify the device type as below:
1.—Reserved
2.—(Sequential Access) MagneticTape
3.—(Direct Access) Floppy Disk
4.—(Direct Access) Hard Disk
5.—(Write Once device) WORM Optical disk
6.—(Read Only) CD-ROM device
7.—(Read Write) CD-RW device
8.—Optical Memory Device (Non CD Optical devices)
    8-0x7E—Reserved
    0x7F—Unknown device
Dir_Status:
The High Bit specifies the direction of the command
1—REMIO Client to REMIO Server
0—REMIO Server to REMIO Client
The lower 7 bits specify the status of the REMIO
1.—Success.
2.—Unsupported Protocol (Server does not support this protocol)
3.—Unsupported Device (Server does not support this device)
4.—Incompatible version (Server does not support this REMIO version)
    (The Client can retry with the version sent back by the server, if it can support that version)
    4—Corrupt Data (Either the signature is bad or checksum incorrect)
    5 to 0x7F—Reserved
Note: A detailed status about the operation of the device specific command is given in the data packet as defined by each protocol.

Server Capability:
0—Reserved
1—Supports OOB Status
    Others are reserved
Operation:
Startup:

The REMIO client always initiates the startup request command (with data length=0, sequence=0) and sends to the REMIO server. The REMIO server should check the version, protocol and device type to see whether it can be supported and returns the proper status code. If an incompatible version error is returned, the return packet from server has the version the server can support. If the client can support this version, it can resend the startup request packet.

Command Requests:

During normal operation, the client forms the data packet as specified in the protocol and device formats, and sends to the server. For each command it increments the sequence number. The client may or may not wait for the response packet. In either case, a proper timeout value should be used to retry the command with the new 10 sequence number.

The server on receiving a command request packet, validates the header. If invalid header, it sends back with "Corrupt Data" status. (The protocol, version and device type can be checked for every packet, but it might not be needed, if the "Startup" sequence is implemented.) Otherwise, it starts processing the data part of the 15 packet and sends the response packet with the same sequence number.

Out of Band (OOB) Status:

In cases of removable devices, the client repeatedly queries the server about the medium status (Removed or not). This will increase unnecessary traffic and overhead for the client and server. To avoid this, an OOB status method can be used. This is not mandatory, but will increase the performance. During startup sequence, the client can use the Server Capability field to determine the server support for OOB Status.

The client on startup get the status using "Get Medium Status" defined for the protocol/device and maintains the state in the client side. The server sends any change 25 in the medium status, in the same format defined for the command "Get Medium Status."

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. A computer-implemented method for accessing a target peripheral at a remote computer from a local computer through a remote access device, the method comprising computer-implemented operations for:
    receiving at the remote access device a local request from the local computer through a first communication interface;
    in response to receiving the local request from the local computer, transmitting an access request to the remote computer through a second communication interface, the access request comprising a request for accessing the target peripheral at the remote computer; and
    upon transmitting the access request to the remote computer through the second communication interface, receiving an access response from the remote computer acknowledging whether the access request was successfully completed.

2. The computer-implemented method of claim 1, wherein the target peripheral comprises an output device at the remote computer; and wherein the access request comprises a request to output data through the output device.

3. The computer-implemented method of claim 2, wherein the access request comprises a plurality of requests to output data through the output device, each of the requests comprising a segment of the data.

4. The computer-implemented method of claim 2, wherein the local request comprises a reference to the data at the local computer; and wherein prior to transmitting the access request to the remote computer through the second communication interface, retrieving the data from the local computer.

5. The computer-implemented method of claim 2, wherein the access request comprises a request to display the data on a display device, to print the data through a printing device, or to write the data on a storage device.

6. The computer-implemented method of claim 1, wherein the target peripheral comprises a storage device at the remote computer; wherein the access request comprises a request for data from the storage device; and wherein the access response comprises the data from the storage device.

7. The computer-implemented method of claim 6, wherein the access request comprises a request for retrieving boot data from a boot image compatible with the local computer from the storage device; wherein the access response comprises the boot data from the boot image compatible with the local computer.

8. The computer-implemented method of claim 6, wherein the access response comprises a plurality of access responses from the storage device, each of the access responses comprising a segment of the data.

9. The computer-implemented method of claim 1 wherein the access request and the access response are encrypted prior to transmission or are transmitted via an encrypted communication protocol.

10. The computer-implemented method of claim 1, wherein the first communication interface is configured to connect to a hot swap interface of the local computer.

11. A remote access device comprising:
    a first communication interface configured to connect the remote access device to a hot swap interface of a local computer;
    a second communication interface configured to connect the remote access device to a secondary communication channel for communicating with a remote computer; and
    a system processor in communication with the first and second communication interfaces, the system processor configured to:
        receive a local request from the local computer through the first communication interface,
        in response to receiving the local request from the local computer, transmit an access request to the remote computer through the second communication interface, the access request comprising a request for accessing the target peripheral at the remote computer, and
        upon transmitting the access request to the remote computer through the second communication interface, receiving an access response from the remote computer acknowledging whether the access request was successfully completed.

12. The remote access device of claim 11, wherein the target peripheral comprises an output device at the remote computer; and wherein the access request comprises a request to output data through the output device.

13. The remote access device of claim 12, wherein the local request comprises a reference to the data at the local computer; and wherein prior to transmitting the access request to the remote computer through the second communication interface, retrieve the data from the local computer.

14. The remote access device of claim 11, wherein the target peripheral comprises a storage device at the remote computer; wherein the access request comprises a request for data from the storage device; and wherein the access response comprises the data from the storage device.

15. The remote access device of claim 14, wherein the access request comprises a request for retrieving boot data from a boot image compatible with the local computer from the storage device; wherein the access response comprises the boot data from the boot image compatible with the local computer.

16. A computer-storage medium having computer-executable instructions stored thereon which, when executed by a computer, cause the computer to:
    receive at a remote access device a local request from a local computer through a first communication interface;
    in response to receiving the local request from the local computer, transmit an access request to a remote computer through a second communication interface, the access request comprising a request for accessing a target peripheral at the remote computer; and
    upon transmitting the access request to the remote computer through the second communication interface, receive an access response from the remote computer acknowledging whether the access request was successfully completed.

17. The computer-storage medium of claim 16, wherein the target peripheral comprises an output device at the remote computer; and wherein the access request comprises a request to output data through the output device.

18. The computer-storage medium of claim 17, wherein the local request comprises a reference to the data at the local computer; and wherein prior to transmitting the access request to the remote computer through the second communication interface, retrieve the data from the local computer.

19. The computer-storage medium of claim 16, wherein the target peripheral comprises a storage device at the remote computer; wherein the access request comprises a request for data from the storage device; and wherein the access response comprises the data from the storage device.

20. The computer-storage medium of claim 19, wherein the access request comprises a request for retrieving boot data from a boot image compatible with the local computer from the storage device; wherein the access response comprises the boot data from the boot image compatible with the local computer.

* * * * *